United States Patent
Markandey

(10) Patent No.: US 6,340,992 B1
(45) Date of Patent: Jan. 22, 2002

(54) AUTOMATIC DETECTION OF LETTERBOX AND SUBTITLES IN VIDEO

(75) Inventor: Vishal Markandey, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/222,452

(22) Filed: Dec. 29, 1998

Related U.S. Application Data

(60) Provisional application No. 60/070,088, filed on Dec. 31, 1997.

(51) Int. Cl.[7] .................................................. H04N 5/46
(52) U.S. Cl. ........................ 348/556; 348/445; 348/913
(58) Field of Search ................................. 348/445, 556, 348/558, 913; 382/168

(56) References Cited

U.S. PATENT DOCUMENTS

| | | | | |
|---|---|---|---|---|
| 5,345,270 A | * | 9/1994 | Saeger et al. ................ 348/435 |
| 5,576,769 A | * | 11/1996 | Lendaro ....................... 348/511 |
| 5,638,130 A | * | 6/1997 | Linzer ......................... 348/445 |
| 5,671,298 A | | 9/1997 | Markandey et al. ......... 382/298 |
| 5,796,442 A | * | 8/1998 | Gove et al. .................. 348/556 |
| 5,808,697 A | * | 9/1998 | Fujimura et al. ............ 348/672 |

* cited by examiner

Primary Examiner—Victor R. Kostak
(74) Attorney, Agent, or Firm—Charles A. Brill; Wade James Brady, III; Frederick J. Telecky, Jr.

(57) ABSTRACT

A method and system for processing video signal. The method and system provide for automatically detecting letterboxing in an input video signal, and scaling a desired portion of the video signal to match a given display device, as well as detecting subtitles in the input video signal and selectively including the subtitles in the desired portion of the video signal. A signal processor (202) receives video image data, calculates image data statistics for each line of the video image, locates at least one desired portion of the video image, scales the desired portion of the video image for display on a display device (116) having a predetermined aspect ratio.

20 Claims, 3 Drawing Sheets

AUTOMATIC DETECTION OF LETTERBOX AND SUBTITLES IN VIDEO

This application claims priority under 35 USC §119(e)(1) of provisional application number 60/070,088 filed Dec. 31, 1997.

FIELD OF THE INVENTION

This invention relates to the field of image processing, more particularly to the detection of various video formats and image scaling, most particularly to the detection of an image aspect ratio and the presence of subtitles and the scaling of the detected image to optimally fit a video screen.

BACKGROUND OF THE INVENTION

Modern televisions are available with a wide screen 16:9 aspect ratio. The aspect ratio of a display is the ratio of display width to display height. The wide screen is capable of displaying more image content than the traditional 4:3 display, and has long been used by motion picture producers and theaters. Since the wide screen televisions are relatively new, however, most of the existing pre-recorded content is intended for viewing on a traditional television having a 4:3 aspect ratio and has been adapted from the original wide screen format to the traditional 4:3 format.

Several means are available to adapt a motion pictures to the 4:3 television format. One alternative is to simply crop the edges of the image to yield a 4:3 image. This method loses much of the artistic content embodied in the motion picture, and sometimes even crops some or all of the characters from certain scenes. A second alternative, which is very common, is to letterbox the images.

Letterboxing occurs when the wide screen image is scaled down to fit the width of the 4:3 display screen. Scaling the image, however, results in an image that is not tall enough to fill the 4:3 display screen. Dark video lines are added above and below the scaled image to fill the display screen. Unfortunately, no standard defines the letterbox size or position. Thus, a letterboxed video source may have an image that uses any number of horizontal lines and is located anywhere within the display region.

The lack of a letterbox standard does not create a problem until the letterboxed image is displayed on a wide screen display. Simply displaying the video image without any video processing yields a small 16:9 image within a large 16:9 display and is a poor utilization of the capabilities of a wide screen display. Many high-end 16:9 televisions offer multiple display modes such as regular, panorama, cinema, full, etc. which apply various scaling ratios to the input video signal. These modes attempt to enable the viewer to optimize the image scaling of a particular video source to the display. But given the variations between source materials in the absence of a letterbox standard, often none of the various modes are ideal. The closest mode typically leaves some black borders, crops off some of the picture or subtitles, or a combination of these. Additionally, some video sources mix letterboxed and non-letterboxed images. For example broadcasts of letterboxed motion pictures include non-letterboxed commercials.

Given the drawbacks of the present display modes, an image processing system and method are needed to automatically match the image processing performed on a video signal to the aspect ratio of the display device.

SUMMARY OF THE INVENTION

Objects and advantages will be obvious, and will in part appear hereinafter and will be accomplished by the present invention which provides a method and system for processing video signal. The method and system provide for automatically detecting letterboxing in an input video signal, and scaling a desired portion of the video signal to match a given display device, as well as detecting subtitles in the input video signal and selectively including the subtitles in the desired portion of the video signal.

According to one embodiment of the disclosed invention, a method of processing a video image is disclosed. The method comprising the steps of receiving video image data, calculating image data statistics for each line of the video image, locating at least one desired portion of the video image, scaling the desired portion of the video image for display on a display device having a pre-determined aspect ratio.

According to one embodiment, at least one image data statistic selected from the group consisting of mean, variance, edge strength, and entropy is calculated for each line for the video image. The image data statistic is compared to a threshold, and lines exceeding the threshold are part of the desired image portion. When more than one image data statistic is computed, the line is part of the desired portion when all of the statistics exceed the threshold.

Alternate embodiments of the disclosed invention selectively include subtitles in the desired portion of the video image, typically depending on the language of the subtitles and the preferences of the viewer. The language of the subtitles is detected by calculating at least one image data statistic selected from the group consisting of mean, variance, edge strength, and entropy is calculated for each line for the video image.

Another embodiment of the disclosed invention provides a display system. The display system comprises a signal processor and a display device. The signal processor receives an input video signal having a first aspect ratio, detects a desired portion of the input video signal, and scales the desired portion to generate an output video signal having a second aspect ratio. The display device receives the output video signal and generates an image.

According to one embodiment of the disclosed display system, the signal processor calculates one or more image data statistics for the input video image. The statistics, such as variance, mean, entropy, and edge strength aid in locating the desired portion of the video image, typically by comparing the statistics on a line-by-line basis to a set of thresholds, one threshold for each statistic. The image data statistics are also used to detect the subtitles and the language of the subtitles. Depending on the preferences of the viewer, one or more languages of subtitles are included in the output video image.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

A new technique has been developed which automatically detects letterbox video formats and scales a video image to fit a non-letterbox video display area. The new technique not only optimizes the image scaling to fit a given display, it is also capable of detecting subtitles in the video stream. Furthermore, the technique distinguishes between English and Kanji subtitles to allow an English-speaking viewer to turn off Kanji subtitles, and vice versa.

Figure 1:
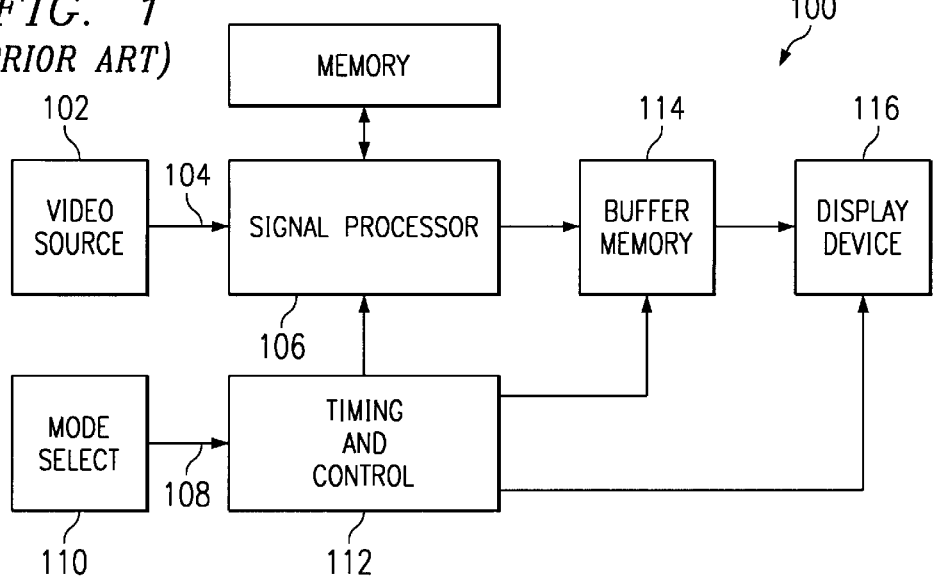
FIG. 1 is a schematic block diagram of an image display system of the prior art.

FIG. 1 is a schematic block diagram of an image display system 100 of the prior art. In FIG. 1, a video source 102 outputs a letterboxed video signal 104 to a signal processor 106. The signal processor 106 also receives a mode select signal 108 from a mode select input device 110. The mode select signal 108, which is often routed through a timing and control block 112, determines which scaling algorithm the signal processor 106 will use to scale the image data. Once the image data is scaled, and any other necessary image processing is performed, the scaled image data is written into a buffer memory 114 and later transferred to the display device 116 for output. The disadvantage of prior art systems is that typically none of the available modes is the optimal match for the video source.

Figure 2:
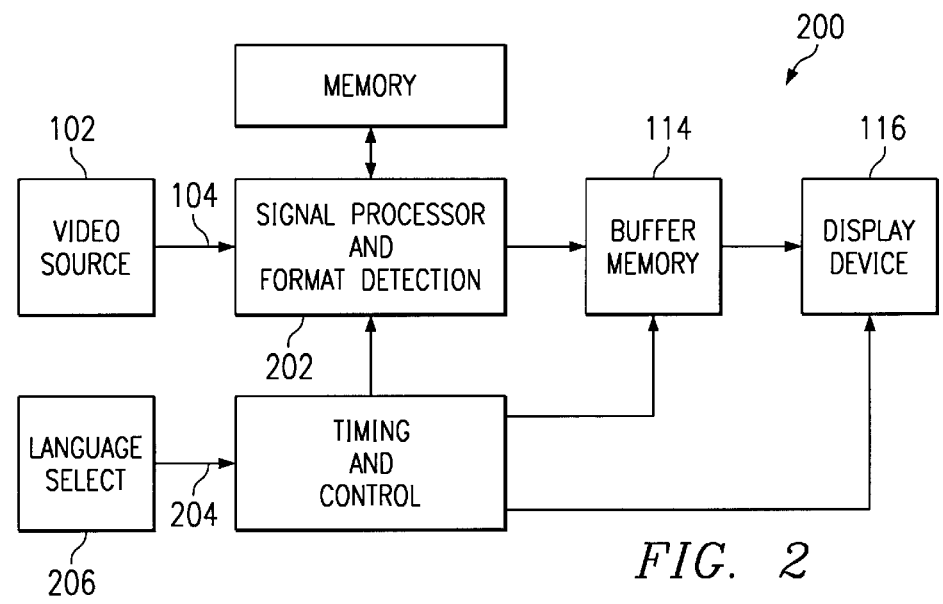
FIG. 2 is a schematic block diagram of a display system according to one embodiment of the present invention.

FIG. 2 is a schematic block diagram of a display system 200 according to one embodiment of the present invention. In FIG. 2, the video source 102 outputs a letterboxed video signal 104 to a signal and format detection processor 202. The video signal 104 in FIG. 2 is either interlaced or non-interlaced data, and is in either luminance/chroma (Y/C) or tri-stimulus (RGB) format. The signal and format detection processor 202 measures the characteristics of the video signal to determine if the video signal is letterboxed, and what portion of the video signal actually contains the desired image. After detecting the size and location of the desired image, the signal and format detection processor 202 scales the video signal 104 to optimally fill the useable area of the display device 116. Image scaling is performed using any one of the many available image scaling techniques.

Figure 3:
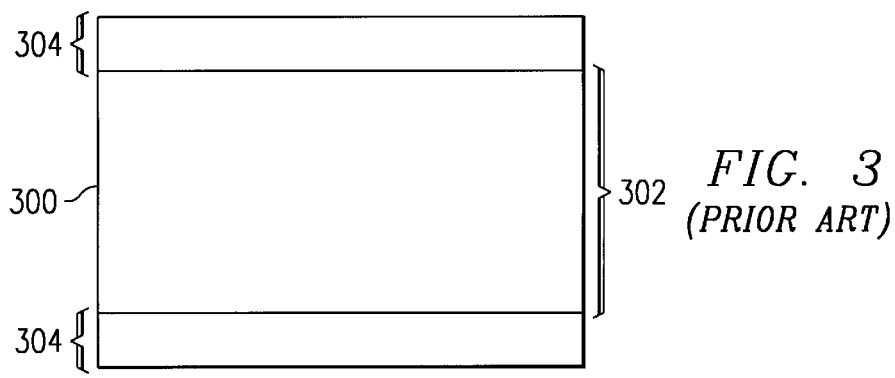
FIG. 3 is a front view of a 4:3 display screen showing the letterboxing that occurs when displaying a 16:9 image.

FIG. 3 is a front view of a 4:3 display screen 300 displaying a 16:9 image 302 in letterbox format. Above and below the 16:9 image 302 video lines have been added to fill the 4:3 display screen 300 after the 16:9 image 302 has been scaled to fit the 4:3 display screen 300. Several image statistics are used to reliably detect letterboxing, including mean intensity, variance, entropy or variance, and edge strength. Intensity alone may be used, but algorithms which use only intensity are not reliable in dark image scenes or when there is no clear intensity change between the image and the letterbox border. Even worse, algorithms which use only intensity may falsely detect letterboxing in non-letterboxed scenes that have a sharp light to dark transition.

Depending on the availability of processing power within the display system, various combinations of the mean intensity, variance, entropy, and edge strength are used. If processing power is limited, a single statistic, preferably variance, is used. Given sufficient processing power, all four statistics, mean intensity, variance, entropy, and edge strength are preferred. The statistics are combined by establishing a threshold value for each through experimentation, and determining a line is in a letterboxed border whenever one or more of the statistics is below the threshold value.

Figure 4:
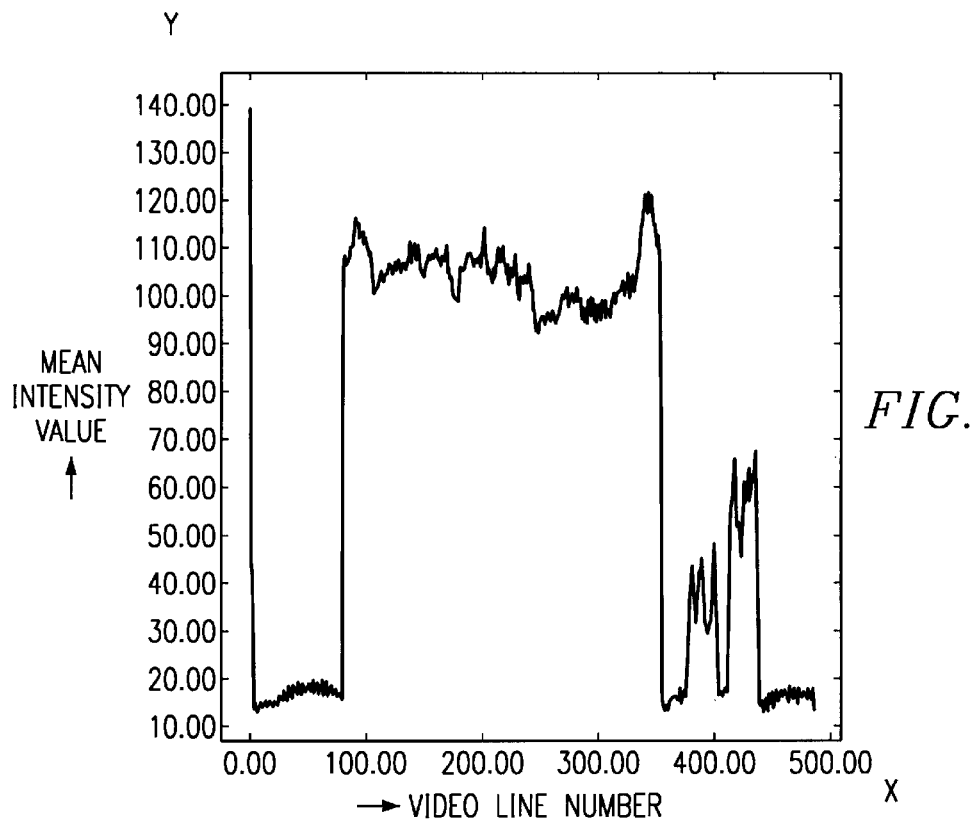
FIG. 4 is a plot of the mean intensity value statistic for each line of a video image signal.
Figure 5:
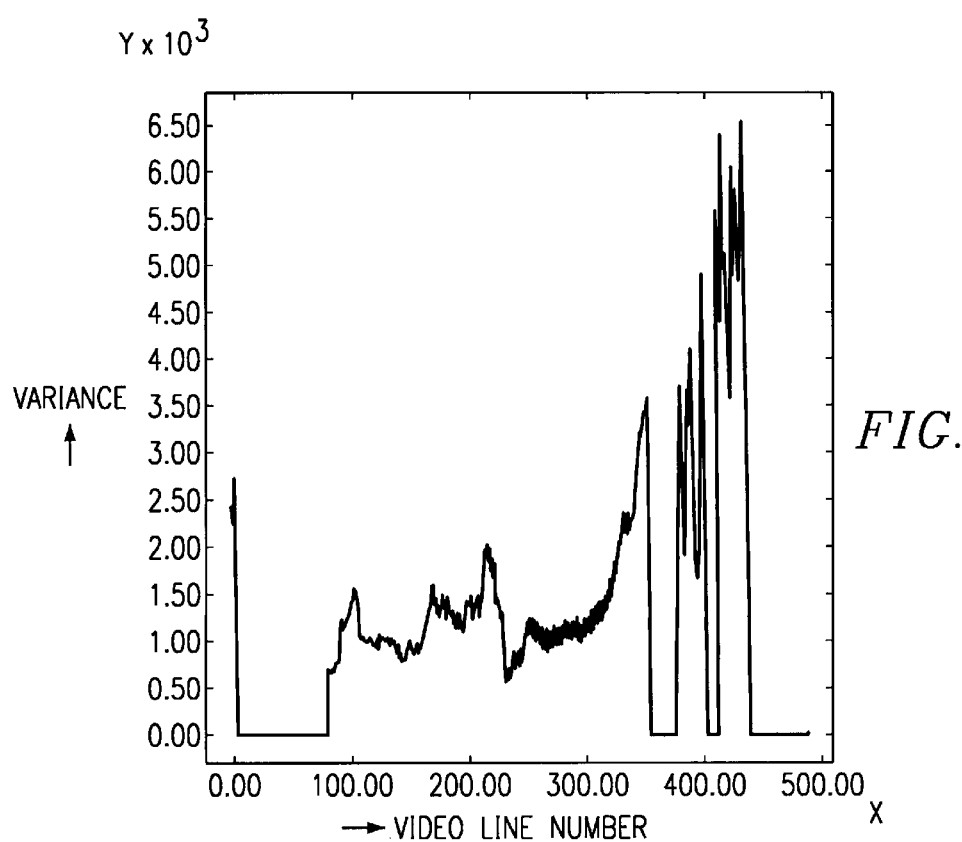
FIG. 5 is a plot of the variance for each line of the signal of FIG. 4
Figure 6:
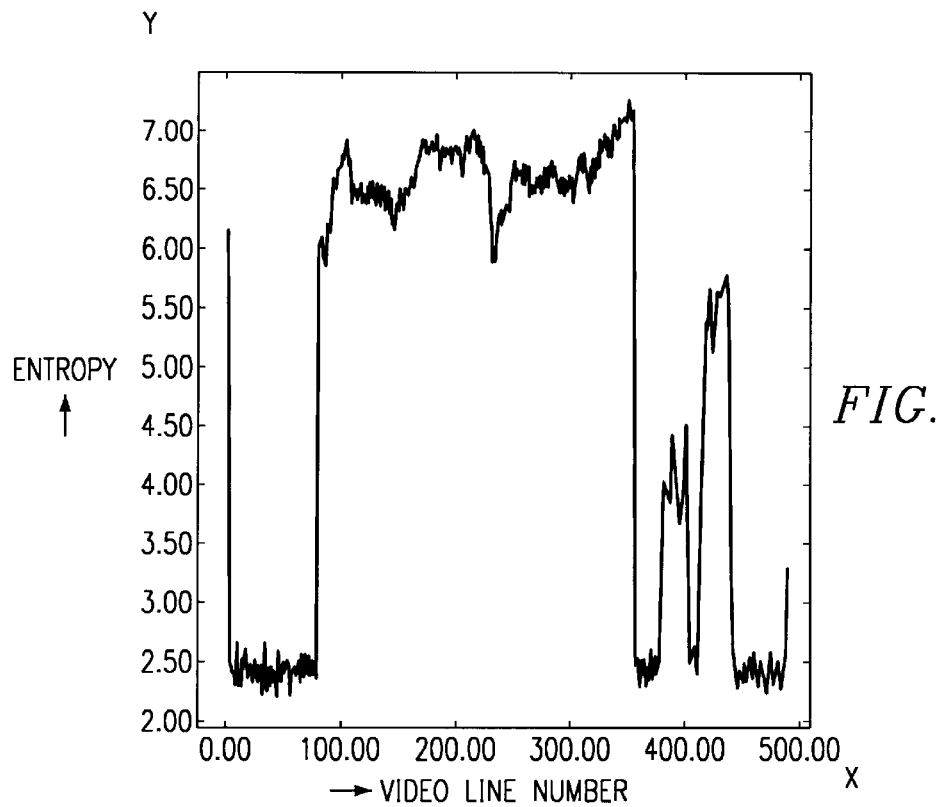
FIG. 6 is a plot of the entropy statistic for the signal of FIG. 4.
Figure 7:
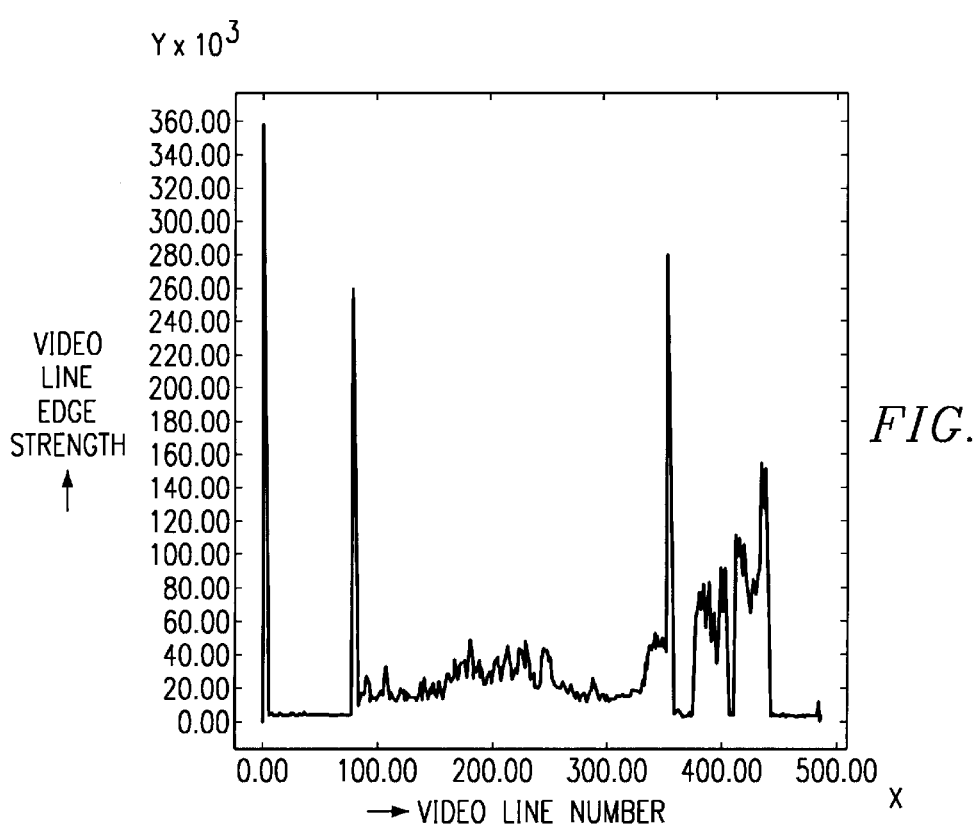
FIG. 7 is a plot of the video line edge strength statistic for the signal of FIG. 4.

FIG. 4 is a plot of the mean intensity value statistic for each line of a video image. The video image has Kanji subtitles which show as peaks between rows 375 and 440. FIG. 5 is a plot of the variance for each line of the same video image. FIG. 6 is a plot of the entropy statistic for the same video image. FIG. 7 is a plot of the video line edge strength statistic for the same image. FIGS. 4 through 7 show the effectiveness of these statistics in detecting the presence and location of a letterboxed image. They also allow for the automatic detection of subtitles in a video image. Since Kanji subtitles have different characteristics than English subtitles, the format detection processor can automatically detect which of the two exists, and selectively display only desired subtitles depending on a language selection signal 204 from the language select block 206.

Entropy is a measure of the variability of data values in a row. Entropy is computed by creating an intensity histogram of the intensity values for a given row. The histogram is normalized by the total number of samples in the row. For each normalized bin k, the following are calculated:

$$a = \log(\text{count}[k]) \text{ Only for non-zero values of count}[k]$$

$$b = \log(2.0)$$

The entropy value for each row is then initialized to zero, and for each bin:

$$\text{entropy value for row } i = \text{entropy value for row } i - \text{count}[k]*a/b$$

Edge strength is measured by various algorithms. The preferred equation for interlaced data is:

$$\text{data\_in}[i+2][j-1]+2*\text{data\_in}[i+2][j]+\text{data\_in}[i+2][j+1]-\text{data\_in}[i-2][j-1]-2*\text{data\_in}[i-2][j]-\text{data\_in}[i-2][j+1]$$

where i is the row index and j is the column index. The non-interlaced equation is:

$$\text{data\_in}[i+1][j-1]+2*\text{data\_in}[i+1][j]+\text{data\_in}[i+1][j+1]-\text{data\_in}[i-1][j-1]-2*\text{data\_in}[i-1][j]-\text{data\_in}[i-1][j+1]$$

Code implementing the measurement of these variables is listed below.

```
entropy_thr = 0.1
mean_thr = 40
edge_thr = 10,000
var_thr = 10
void mean_var()            /* Computes the Mean and Variance
Statistics */
    {
    int i,j
    for(i=0; i<INrow; i++)
        {
        mean[i]=0.0;
        var[i]=0.0;
        for(j=0; j<INcol; j++)
            {
            mean[i] = mean[i] + data_in[i][j];
            }
        mean[i] = mean[i]/INcol;
        for(j=0; j<INcol; j++)
            {
            var[i] = var[i] + data_in[i][j] -mean[i])*(data_in[i][j] - mean[i]);
            }
        var[i] = var[i]/(INcol-1);
        }
    }
void entr()                /* Computes the Entropy statistic */
    {
    int i,j,k;
    double a,b;
    for(i=0; i<INrow; i++)
        {
        entropy[i] = 0.0;
        for (k=0; k<256;k++)
            {
            count[k] = 0.0;
            }
        for(+0; j<INcol; j++)
            {
            count[data_in[i][j]] = count [data_in[i][j]] + 1.0;
            }
        for(k=0;k<256;k++)
            {
            connt[k] = count[k]/INcol;
            }
        for(k+0;k<256;k++)
            {
            if(count[k]>0.0)
                {
                a = log(count[k]);
                b = lo((double)2.0);
                entropy[i] = entropy[i] = count[k]*a/b;
                }
            }
        }
    }
void edg()                 /*Computes the Edge Strength
statistic */
    {
    int i,j;
    double edge_raw;
    for(=2;i<INrow-2; i++)
        {
        edge[i] = 0.0;
        }
        for(j=2;j<INcol-2;j++)
            {
            edge_raw = (fabs)(data_in[i+2][j-1]+2.0*data_in[i+2][j]+data_in[i+2]{j+1}-
                    data_in[i-2][j-1]-2.0*data_in[i-2][j]-data_in[i-2][j+1]);
            edge[i] = edge[i]+edge_raw;
            }
    }
void do_thresholds()       /*Performs thresholding */
    {
    int i,j;
    double entropy_diff,mean_diff;
    for(i=0;i<INrow/2;i++)
        {
        entropy_diff = (fabs)(entropy[i] - entropy[i-1]);
        mean_diff = (fabs)(mean[i] - mean[i-1]);
        if((entropy_diff>entropy_thr)&&(mean_diff>mean_thr)&&(edge[i]>edge_thr))
```

```
            {
            set_boundary(i);/
            }
        if((var[i]<var_thr&&var[i+1]>var_thr)||(var_thr&&var[i+1]<var_thr))
            {
            set_boundary(i);
            }
        }
    }
for(i=INrow/2;i<INrow-10;i++0
    {
    entropy_diff = (fabs)(entropy[i]- entropy{i-1]);
    mean_diff = (fabs)(mean[i]- mean[i-1]);
    if((entropy_dif>entropy_thr)&&(mean diff>mean_thr)&&(edge[i]>edge_thr))
        {
        set_boundary(i);
        }
    if((var[i]<var_thr&&var[i+1]>var_thr)||(var[i]>var_thr&&var[i+1 }<var_thr))
        set_boundary(i);
    }
}
```

Thus, although there has been disclosed to this point a particular embodiment for the automatic detection of letterboxing or subtitles in a video signal and a system therefore. It is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. A method of processing a video image comprising the steps of:
   receiving video image data, said video image data comprising a series of image frames, each said image frame comprised of image data for each pixel in an array;
   calculating at least one image data statistic for each line of said array, said image data statistic calculated using only said image data of said line of said array;
   locating at least one desired portion of said video image data using said at least one statistic;
   scaling said desired portion of said video image data for display on a display device having a pre-determined aspect ratio.

2. The method of claim 1, said step of receiving further comprising the step of receiving a letterboxed video signal.

3. The method of claim 1, said step of calculating comprising the step of:
   calculating a value for at least one image data statistic selected from the group consisting of mean, variance, and entropy.

4. The method of claim 1, said step of calculating comprising the step of:
   calculating a value for each line of said image data for at least one image data statistic selected from the group consisting of mean, variance, and entropy.

5. The method of claim 4, said step of locating comprising the step of:
   comparing said value for each line of said image data with at least one threshold value, said threshold value selected to indicate said one line is in said desired portion of said video image data when said at least one value exceeds said threshold value.

6. The method of claim 1, said step of calculating comprising the step of calculating a value for each line of said image data for at least two image data statistics selected from the group consisting of mean, variance, edge strength, and entropy, said step of locating comprising the step of comparing each of said at least two image data statistics for each line of said image data with a threshold value, each said threshold value selected to indicate said one line is in said desired portion of said video image data when all of said at least two image data statistics exceed said threshold value.

7. The method of claim 1, said step of locating used to locate a subtitle region.

8. The method of claim 7, further comprising the step of:
   determining whether said subtitle region is a desired portion.

9. The method of claim 8, said step of determining comprising the step of:
   comparing said image data statistics to threshold values.

10. The method of claim 9, said step of comparing further comprising the step of:
    selecting threshold values to exclude subtitles of at least one language and include subtitles of at least one other language.

11. The method of claim 1, said step of scaling comprising the step of:
    scaling said desired portion of a letterboxed 4:3 input video image to a 16:9 output video image.

12. A display system comprising:
    a signal processor, said signal processor for receiving an input video signal having a first aspect ratio, said signal processor for detecting a desired portion of said input video signal and scaling said desired portion to generate an output video signal having a second aspect ratio, said signal processor operable to detect said desired portion of said input video signal by calculating at least one image data statistic for each line of said input video signal using only said line of said input video signal;
    a display device for receiving and displaying said output video signal.

13. The display system of claim 12, said signal processor operable to calculate at least one image data statistic selected from the group consisting of mean, variance, and entropy.

14. The display system of claim 12, said signal processor operable to calculate at least one image data statistic selected from the group consisting of mean, variance, and entropy for each line of said input video signal.

15. The display system of claim 14, said signal processor operable to compare said at least one image data statistic for each line of said input video signal with at least one threshold value, said threshold value selected to indicate said each line is in said desired portion of said input video signal when said at least one value exceeds said threshold value.

16. The display system of claim 12, said signal processor operable to calculate at least two image data statistics selected from the group consisting of mean, variance, edge strength, and entropy for each line of said input video signal, and to compare each of said at least two image data statistics with a threshold value, each said threshold value, said threshold value selected to indicate said each line is in said desired portion of said input video signal when all of said at least two image data statistics exceed each said threshold value.

17. The display system of claim 12, said processor operable to detect subtitles and to selectively include said subtitles in said output video signal.

18. The display system of claim 17, said processor operable to detect subtitles and to selectively include said subtitles in said output video signal based on the language of said subtitles.

19. The display system of claim 12, said processor operable to scale said desired portion of a letterboxed 4:3 input video signal to a 16:9 output video signal.

20. A method of processing a video image comprising the steps of:

selecting at least one threshold value to exclude subtitles of at least one language and include subtitles of at least one other language;

receiving video image data, said video image data comprising a series of image frames, each said image frame comprised of image data for each pixel in an array;

calculating image data statistics for each line of said array;

locating at least one subtitle region of said video image data by comparing said at least one statistic to said at least one threshold value;

scaling said desired portion of said video image data for display on a display device having a pre-determined aspect ratio.

* * * * *